(12) United States Patent
Petrescu et al.

(10) Patent No.: US 7,855,737 B2
(45) Date of Patent: Dec. 21, 2010

(54) METHOD OF MAKING A DIGITAL CAMERA IMAGE OF A SCENE INCLUDING THE CAMERA USER

(75) Inventors: Stefan Petrescu, Bucharest (RO); Peter Corcoran, Claregalway (IE); Alexandru Drimbarean, Galway (IE)

(73) Assignee: FotoNation Ireland Limited, Galway (IE)

( * ) Notice: Subject to any disclaimer, the term of this patent is extended or adjusted under 35 U.S.C. 154(b) by 392 days.

(21) Appl. No.: 12/055,958

(22) Filed: Mar. 26, 2008

(65) Prior Publication Data

US 2009/0244296 A1    Oct. 1, 2009

(51) Int. Cl.
H04N 5/262 (2006.01)
H04N 5/222 (2006.01)

(52) U.S. Cl. .................. 348/239; 348/333.12

(58) Field of Classification Search ............. 348/222.1, 348/239, 333.01–333.03, 333.12
See application file for complete search history.

(56) References Cited

U.S. PATENT DOCUMENTS

| | | |
|---|---|---|
| 4,047,187 A | 9/1977 | Mashimo et al. |
| 4,317,991 A | 3/1982 | Stauffer |
| 4,367,027 A | 1/1983 | Stauffer |
| RE031,370 E | 9/1983 | Mashimo et al. |
| 4,448,510 A | 5/1984 | Murakoshi |
| 4,456,354 A | 6/1984 | Mizokami |
| 4,638,364 A | 1/1987 | Hiramatsu |
| 4,690,536 A | 9/1987 | Nakai et al. |
| 4,796,043 A | 1/1989 | Izumi et al. |
| 4,970,663 A | 11/1990 | Bedell et al. |
| 4,970,683 A | 11/1990 | Harshaw et al. |
| 4,975,969 A | 12/1990 | Tal |

(Continued)

FOREIGN PATENT DOCUMENTS

EP    1128316 A1    8/2001

(Continued)

OTHER PUBLICATIONS

Aoki, Hiroyuki et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICPR '00), 2000. vol. 2.

(Continued)

*Primary Examiner*—Sinh Tran
*Assistant Examiner*—Daniel M Pasiewicz
(74) *Attorney, Agent, or Firm*—Andrew V. Smith

(57) ABSTRACT

A method of making an image in a digital camera comprises capturing a digital image of a scene into which the camera user is to be inserted, and superimposing a symbol (subject locator) onto the scene image representing at least a part of a human subject. The subject locator is scaled to a desired size and moved to a desired position relative to the scene image. Next a digital image of the user is captured, and at least the part of the user image represented by the subject locator is extracted. The part of the user image represented by the subject locator is scaled (before or after extraction) to substantially the same size as the subject locator and inserted into the first image at the position of the subject locator.

32 Claims, 5 Drawing Sheets

U.S. PATENT DOCUMENTS

| | | |
|---|---|---|
| 5,008,946 A | 4/1991 | Ando |
| 5,018,017 A | 5/1991 | Sasaki et al. |
| RE033,682 E | 9/1991 | Hiramatsu |
| 5,051,770 A | 9/1991 | Cornuejols |
| 5,063,603 A | 11/1991 | Burt |
| 5,111,231 A | 5/1992 | Tokunaga |
| 5,130,935 A | 7/1992 | Takiguchi |
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |
| 5,227,837 A | 7/1993 | Terashita |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,576,759 A | 11/1996 | Kawamura et al. |
| 5,629,752 A * | 5/1997 | Kinjo ........................ 355/35 |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,802,220 A | 9/1998 | Black et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE036,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,966,549 A | 10/1999 | Hara et al. |
| 5,978,519 A | 11/1999 | Bollman et al. |
| 5,991,456 A | 11/1999 | Rahman et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,181,805 B1 | 1/2001 | Koike et al. |
| 6,188,777 B1 | 2/2001 | Darrell et al. |
| 6,192,149 B1 | 2/2001 | Eschbach et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,282,317 B1 | 8/2001 | Luo et al. |
| 6,301,370 B1 | 10/2001 | Steffens et al. |
| 6,301,440 B1 | 10/2001 | Bolle et al. |
| 6,332,033 B1 | 12/2001 | Qian |
| 6,349,373 B2 | 2/2002 | Sitka et al. |
| 6,351,556 B1 | 2/2002 | Loui et al. |
| 6,393,136 B1 | 5/2002 | Amir et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | Deluca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,546 B1 | 1/2003 | Cosatto et al. |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,633,655 B1 | 10/2003 | Hong et al. |
| 6,661,907 B2 | 12/2003 | Ho et al. |
| 6,678,407 B1 | 1/2004 | Tajima |
| 6,697,503 B2 | 2/2004 | Matsuo et al. |
| 6,697,504 B2 | 2/2004 | Tsai |
| 6,700,999 B1 | 3/2004 | Yang |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,801,250 B1 | 10/2004 | Miyashita |
| 6,816,156 B2 * | 11/2004 | Sukeno et al. ............... 345/207 |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,885,760 B2 | 4/2005 | Yamada et al. |

| | | | |
|---|---|---|---|
| 6,900,840 B1 | 5/2005 | Schinner et al. | |
| 6,937,773 B1 | 8/2005 | Nozawa et al. | |
| 6,940,545 B1 | 9/2005 | Ray et al. | |
| 6,959,109 B2 | 10/2005 | Moustafa | |
| 6,965,684 B2 | 11/2005 | Chen et al. | |
| 6,977,687 B1 | 12/2005 | Suh | |
| 6,993,157 B1 | 1/2006 | Oue et al. | |
| 7,003,135 B2 | 2/2006 | Hsieh et al. | |
| 7,020,337 B2 | 3/2006 | Viola et al. | |
| 7,024,053 B2 * | 4/2006 | Enomoto | 382/284 |
| 7,027,619 B2 | 4/2006 | Pavlidis et al. | |
| 7,027,621 B1 | 4/2006 | Prokoski | |
| 7,034,848 B2 | 4/2006 | Sobol | |
| 7,035,456 B2 | 4/2006 | Lestideau | |
| 7,035,462 B2 | 4/2006 | White et al. | |
| 7,035,467 B2 | 4/2006 | Nicponski | |
| 7,038,709 B1 | 5/2006 | Verghese | |
| 7,038,715 B1 | 5/2006 | Flinchbaugh | |
| 7,039,222 B2 | 5/2006 | Simon et al. | |
| 7,042,511 B2 | 5/2006 | Lin | |
| 7,043,465 B2 | 5/2006 | Pirim | |
| 7,050,607 B2 | 5/2006 | Li et al. | |
| 7,057,653 B1 | 6/2006 | Kubo | |
| 7,064,776 B2 | 6/2006 | Sumi et al. | |
| 7,082,212 B2 | 7/2006 | Liu et al. | |
| 7,088,386 B2 | 8/2006 | Goto | |
| 7,099,510 B2 | 8/2006 | Jones et al. | |
| 7,106,374 B1 | 9/2006 | Bandera et al. | |
| 7,106,887 B2 | 9/2006 | Kinjo | |
| 7,110,569 B2 | 9/2006 | Brodsky et al. | |
| 7,110,575 B2 | 9/2006 | Chen et al. | |
| 7,113,641 B1 | 9/2006 | Eckes et al. | |
| 7,119,838 B2 | 10/2006 | Zanzucchi et al. | |
| 7,120,279 B2 | 10/2006 | Chen et al. | |
| 7,151,843 B2 | 12/2006 | Rui et al. | |
| 7,158,680 B2 | 1/2007 | Pace | |
| 7,162,076 B2 | 1/2007 | Liu | |
| 7,162,101 B2 * | 1/2007 | Itokawa et al. | 382/282 |
| 7,171,023 B2 | 1/2007 | Kim et al. | |
| 7,171,025 B2 | 1/2007 | Rui et al. | |
| 7,190,829 B2 | 3/2007 | Zhang et al. | |
| 7,194,114 B2 | 3/2007 | Schneiderman | |
| 7,200,249 B2 | 4/2007 | Okubo et al. | |
| 7,218,759 B1 | 5/2007 | Ho et al. | |
| 7,227,976 B1 | 6/2007 | Jung et al. | |
| 7,254,257 B2 | 8/2007 | Kim et al. | |
| 7,269,292 B2 | 9/2007 | Steinberg | |
| 7,274,822 B2 | 9/2007 | Zhang et al. | |
| 7,274,832 B2 | 9/2007 | Nicponski | |
| 7,295,233 B2 | 11/2007 | Steinberg et al. | |
| 7,315,630 B2 | 1/2008 | Steinberg et al. | |
| 7,315,631 B1 | 1/2008 | Corcoran et al. | |
| 7,317,815 B2 | 1/2008 | Steinberg et al. | |
| 7,321,391 B2 * | 1/2008 | Ishige | 348/239 |
| 7,336,821 B2 | 2/2008 | Ciuc et al. | |
| 7,352,393 B2 * | 4/2008 | Sakamoto | 348/239 |
| 7,362,368 B2 | 4/2008 | Steinberg et al. | |
| 7,403,643 B2 | 7/2008 | Ianculescu et al. | |
| 7,440,593 B1 | 10/2008 | Steinberg et al. | |
| 7,502,494 B2 | 3/2009 | Tafuku et al. | |
| 7,515,740 B2 | 4/2009 | Corcoran et al. | |
| 7,551,211 B2 * | 6/2009 | Taguchi et al. | 348/239 |
| 7,612,794 B2 | 11/2009 | He et al. | |
| 7,620,214 B2 | 11/2009 | Chen et al. | |
| 7,623,733 B2 * | 11/2009 | Hirosawa | 382/284 |
| 7,636,485 B2 | 12/2009 | Simon et al. | |
| 7,652,693 B2 * | 1/2010 | Miyashita et al. | 348/239 |
| 7,733,388 B2 * | 6/2010 | Asaeda | 348/239 |
| 2001/0005222 A1 | 6/2001 | Yamaguchi | |
| 2001/0028731 A1 | 10/2001 | Covell et al. | |
| 2001/0031142 A1 | 10/2001 | Whiteside | |
| 2001/0038712 A1 | 11/2001 | Loce et al. | |
| 2001/0038714 A1 | 11/2001 | Masumoto et al. | |
| 2002/0081003 A1 | 6/2002 | Sobol | |
| 2002/0105662 A1 | 8/2002 | Patton et al. | |
| 2002/0106114 A1 | 8/2002 | Yan et al. | |
| 2002/0114535 A1 | 8/2002 | Luo | |
| 2002/0118287 A1 | 8/2002 | Grosvenor et al. | |
| 2002/0136433 A1 | 9/2002 | Lin | |
| 2002/0150291 A1 | 10/2002 | Naf et al. | |
| 2002/0150662 A1 | 10/2002 | Dewis et al. | |
| 2002/0168108 A1 | 11/2002 | Loui et al. | |
| 2002/0172419 A1 | 11/2002 | Lin et al. | |
| 2002/0176609 A1 | 11/2002 | Hsieh et al. | |
| 2002/0181801 A1 | 12/2002 | Needham et al. | |
| 2002/0191861 A1 | 12/2002 | Cheatle | |
| 2003/0012414 A1 | 1/2003 | Luo | |
| 2003/0023974 A1 | 1/2003 | Dagtas et al. | |
| 2003/0025812 A1 | 2/2003 | Slatter | |
| 2003/0035573 A1 | 2/2003 | Duta et al. | |
| 2003/0048950 A1 | 3/2003 | Savakis et al. | |
| 2003/0052991 A1 | 3/2003 | Stavely et al. | |
| 2003/0059107 A1 | 3/2003 | Sun et al. | |
| 2003/0059121 A1 | 3/2003 | Savakis et al. | |
| 2003/0071908 A1 | 4/2003 | Sannoh et al. | |
| 2003/0084065 A1 | 5/2003 | Lin et al. | |
| 2003/0107649 A1 | 6/2003 | Flickner et al. | |
| 2003/0117501 A1 * | 6/2003 | Shirakawa | 348/218.1 |
| 2003/0118216 A1 | 6/2003 | Goldberg | |
| 2003/0123713 A1 | 7/2003 | Geng | |
| 2003/0123751 A1 | 7/2003 | Krishnamurthy et al. | |
| 2003/0142209 A1 | 7/2003 | Yamazaki et al. | |
| 2003/0151674 A1 | 8/2003 | Lin | |
| 2003/0169907 A1 | 9/2003 | Edwards et al. | |
| 2003/0202715 A1 | 10/2003 | Kinjo | |
| 2004/0022435 A1 | 2/2004 | Ishida | |
| 2004/0095359 A1 | 5/2004 | Simon et al. | |
| 2004/0120391 A1 | 6/2004 | Lin et al. | |
| 2004/0120399 A1 | 6/2004 | Kato | |
| 2004/0170397 A1 | 9/2004 | Ono | |
| 2004/0175021 A1 | 9/2004 | Porter et al. | |
| 2004/0179719 A1 | 9/2004 | Chen et al. | |
| 2004/0218832 A1 | 11/2004 | Luo et al. | |
| 2004/0223649 A1 | 11/2004 | Zacks et al. | |
| 2004/0228505 A1 | 11/2004 | Sugimoto | |
| 2005/0013479 A1 | 1/2005 | Xiao et al. | |
| 2005/0036044 A1 * | 2/2005 | Funakura | 348/239 |
| 2005/0041121 A1 | 2/2005 | Steinberg et al. | |
| 2005/0068446 A1 | 3/2005 | Steinberg et al. | |
| 2005/0068452 A1 | 3/2005 | Steinberg et al. | |
| 2005/0069208 A1 | 3/2005 | Morisada | |
| 2005/0089218 A1 | 4/2005 | Chiba | |
| 2005/0104848 A1 | 5/2005 | Yamaguchi et al. | |
| 2005/0105780 A1 | 5/2005 | Ioffe | |
| 2005/0140801 A1 | 6/2005 | Prilutsky et al. | |
| 2005/0185054 A1 | 8/2005 | Edwards et al. | |
| 2005/0231625 A1 | 10/2005 | Parulski et al. | |
| 2005/0275721 A1 | 12/2005 | Ishii | |
| 2006/0006077 A1 | 1/2006 | Mosher et al. | |
| 2006/0008152 A1 | 1/2006 | Kumar et al. | |
| 2006/0008173 A1 | 1/2006 | Matsugu et al. | |
| 2006/0018517 A1 | 1/2006 | Chen et al. | |
| 2006/0029265 A1 | 2/2006 | Kim et al. | |
| 2006/0039690 A1 | 2/2006 | Steinberg et al. | |
| 2006/0050933 A1 | 3/2006 | Adam et al. | |
| 2006/0098875 A1 | 5/2006 | Sugimoto | |
| 2006/0098890 A1 | 5/2006 | Steinberg et al. | |
| 2006/0120599 A1 | 6/2006 | Steinberg et al. | |
| 2006/0140455 A1 | 6/2006 | Costache et al. | |
| 2006/0147192 A1 | 7/2006 | Zhang et al. | |
| 2006/0177100 A1 | 8/2006 | Zhu et al. | |
| 2006/0177131 A1 | 8/2006 | Porikli | |
| 2006/0203106 A1 | 9/2006 | Lawrence et al. | |
| 2006/0203107 A1 | 9/2006 | Steinberg et al. | |
| 2006/0204034 A1 | 9/2006 | Steinberg et al. | |
| 2006/0204055 A1 | 9/2006 | Steinberg et al. | |

| | | | |
|---|---|---|---|
| 2006/0204056 | A1 | 9/2006 | Steinberg et al. |
| 2006/0204058 | A1 | 9/2006 | Kim et al. |
| 2006/0204110 | A1 | 9/2006 | Steinberg et al. |
| 2006/0210264 | A1 | 9/2006 | Saga |
| 2006/0228037 | A1 | 10/2006 | Simon et al. |
| 2006/0257047 | A1 | 11/2006 | Kameyama et al. |
| 2006/0268150 | A1 | 11/2006 | Kameyama et al. |
| 2006/0269270 | A1 | 11/2006 | Yoda et al. |
| 2006/0280380 | A1 | 12/2006 | Li |
| 2006/0285754 | A1 | 12/2006 | Steinberg et al. |
| 2006/0291739 | A1 | 12/2006 | Li et al. |
| 2007/0018966 | A1 | 1/2007 | Blythe et al. |
| 2007/0070440 | A1 | 3/2007 | Li et al. |
| 2007/0071347 | A1 | 3/2007 | Li et al. |
| 2007/0091203 | A1 | 4/2007 | Peker et al. |
| 2007/0098303 | A1 | 5/2007 | Gallagher et al. |
| 2007/0110305 | A1 | 5/2007 | Corcoran et al. |
| 2007/0116379 | A1 | 5/2007 | Corcoran et al. |
| 2007/0116380 | A1 | 5/2007 | Ciuc et al. |
| 2007/0133901 | A1 | 6/2007 | Aiso |
| 2007/0154095 | A1 | 7/2007 | Cao et al. |
| 2007/0154096 | A1 | 7/2007 | Cao et al. |
| 2007/0160307 | A1 | 7/2007 | Steinberg et al. |
| 2007/0189748 | A1 | 8/2007 | Drimbarean et al. |
| 2007/0189757 | A1 | 8/2007 | Steinberg et al. |
| 2007/0201724 | A1 | 8/2007 | Steinberg et al. |
| 2007/0296833 | A1 | 12/2007 | Corcoran et al. |
| 2008/0013798 | A1 | 1/2008 | Ionita et al. |
| 2008/0037827 | A1 | 2/2008 | Corcoran et al. |
| 2008/0037839 | A1 | 2/2008 | Corcoran et al. |
| 2008/0037840 | A1 | 2/2008 | Steinberg et al. |
| 2008/0043122 | A1 | 2/2008 | Steinberg et al. |
| 2008/0049970 | A1 | 2/2008 | Ciuc et al. |
| 2008/0055433 | A1 | 3/2008 | Steinberg et al. |
| 2008/0075385 | A1 | 3/2008 | David et al. |
| 2008/0144966 | A1 | 6/2008 | Steinberg et al. |
| 2008/0175481 | A1 | 7/2008 | Petrescu et al. |
| 2008/0205712 | A1 | 8/2008 | Ionita et al. |
| 2008/0240555 | A1 | 10/2008 | Nanu et al. |
| 2009/0052750 | A1 | 2/2009 | Steinberg et al. |
| 2009/0175609 | A1* | 7/2009 | Tan ............................ 396/77 |

FOREIGN PATENT DOCUMENTS

| | | |
|---|---|---|
| EP | 1441497 A2 | 7/2004 |
| EP | 1453002 A2 | 9/2004 |
| EP | 1626569 A1 | 2/2006 |
| EP | 1887511 A1 | 2/2008 |
| GB | 2370438 A1 | 6/2002 |
| JP | 5260360 A2 | 10/1993 |
| JP | 25164475 A2 | 6/2005 |
| JP | 26005662 A2 | 1/2006 |
| JP | 26254358 A2 | 9/2006 |
| WO | WO 00/76398 A1 | 12/2000 |
| WO | WO-02052835 A2 | 7/2002 |
| WO | WO-2007095477 A2 | 8/2007 |
| WO | WO-2007095477 A3 | 8/2007 |
| WO | WO-2007095483 A2 | 8/2007 |
| WO | WO-2007095553 A2 | 8/2007 |
| WO | WO-2007095553 A3 | 8/2007 |
| WO | WO 2007/128117 A1 | 11/2007 |
| WO | WO-2007142621 A1 | 12/2007 |
| WO | WO-2008015586 A2 | 2/2008 |
| WO | WO-2008015586 A3 | 2/2008 |
| WO | WO-2008018887 A1 | 2/2008 |
| WO | WO-2008023280 A2 | 2/2008 |
| WO | WO-2008104549 A2 | 9/2008 |

OTHER PUBLICATIONS

Batur et al.. "Adaptive Active Appearance Models", IEEE Transactions on Image Processing, 2005, pp. 1707-1721, vol. 14—Issue 11.
Beraldin, J.A. et al., "Object Model Creation from Multiple Range Images: Acquisition. Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.
Beymer, David, "Pose-Invariant face Recognition Using Real and Virtual Views, A.I. Technical Report No. 1574", Mass Inst of Technology Artificial Intelligence Laboratory, 1996, pp. 1-176.
Bradski Gary et al., "Learning-Based Computer Vision with Intel's Open Source Computer Vision Library", Intel Technology, 2005, pp. 119-130, vol. 9-Issue 2.
Buenaposada, J., "Efficiently estimating 1-3,16 facial expression and illumination in appearance based tracking, Retrieved from the Internet: URL:http://www.bmva.ac.uk/bmvc/2006/[retrieved on Sep. 1, 2008]", Proc. British machine vision conference, 2006.
Chang, T., "Texture Analysis and Classification with Tree-Structured Wavelet Transform", IEEE Transactions on Image Processing, 1993, pp. 429-441, vol. 2—Issue 4.
Cootes T. et al., "Modeling Facial Shape and Appearance, S. Li and K. K. Jain (Eds.): "Handbook of face recognition", XP002494037", 2005, Chapter 3, Springer.
Cootes, T.F. et al., "A comparative evaluation of active appearance model algorithms", Proc. 9th British Machine Vison Conference. British Machine Vision Association. 1998, pp. 680-689.
Cootes, T.F. et al., "On representing edge structure for model matching", Proc. IEEE Computer Vision and Pattern Recognition, 2001, pp. 1114-1119.
Corcoran, P. et al.. "Automatic Indexing of Consumer Image Collections Using Person Recognition Techniques", Digest of Technical Papers. International Conference on Consumer Electronics, 2005. pp. 127-128.
Costache, G. et al., "In-Camera Person-Indexing of Digital Images", Digest of Technical Papers. International Conference on Consumer Electronics, 2006, pp. 339-340.
Crowley, J. et al., "Multi-modal tracking of faces for video communication, http://citeseer.ist.psu.edu/crowley97multimodal.hml", In Computer Vision and Patent Recognition. 1997.
Dalton, John, "Digital Cameras and Electronic Color image Acquisition, Abstract printed from http://csdl.computer.org/comp/proceedings/compcon/1996/7414/00/74140431abs.htm", COMPCON Spring '96 41st IEEE International Conference, 1996.
Demirkir, C. et al., "Face detection using boosted tree classifier stages", Proceedings of the IEEE 12th Signal Processing and Communications Applications Conference, 2004, pp. 575-578.
Donner, Rene et al., "Fast Active Appearance Model Search Using Canonical Correlation Analysis". IEEE Transactions on Pattern Analysis and Machine Intelligence, 2006, pp. 1690-1694, vol. 28—Issue 10.
Drimbarean, A.F. et al., "Image Processing Techniques to Detect and Filter Objectionable Images based on Skin Tone and Shape Recognition", International Conference on Consumer Electronics, 2001. pp. 278-279.
Edwards, G.J. et al., "Advances in active appearance models", International Conference on Computer Vision (ICCV'99), 1999, pp. 137-142.
Edwards, G.J. et al., "Learning to identify and track faces in image sequences. Automatic Face and Gesture Recognition", IEEE Comput. Soc. 1998, pp. 260-265.
Feraud, R. et al., "A Fast and Accurate Face Detector Based on Neural Networks", IEEE Transactions on Pattern Analysis and Machine Intelligence, 2001, pp. 42-53, vol. 23—Issue 1.
Fernandez, Anna T. et al., "Synthetic Elevation Beamforming and Image Acquisition Capabilities Using an 8xx128 1.75D Array, Abstract Printed from http://www.ieee-uffc.org/archive/uffc/trans/toc/abs/03/t0310040.htm", The Technical Institute of Electrical and Electronics Engineers.
Froba, B. et al.. "Face detection with the modified census transform", Proceedings of The Sixth IEEE International Conference on Automatic Face and Gesture Recognition, 2004, pp. 91-96.
Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proceedings of lasted "Signal and Image Processing". 2002, pp. 1-6.

Garnaoui, H.H. et al., "Visual Masking and the Design of Magnetic Resonance Image Acquisition, Abstract printed from http://csdl.computer.org/comp/procedings/icip/1995/7310/01/73100625abs.htm". International Conference on Image Processing, 1995, vol. 1.

Gaubatz, Matthew et al., "Automatic Red-Eye Detection and Correction", IEEE ICIP, Proceedings 2002 Intl Conf on Image Processing, 2002, pp. 1-804-1-807. vol. 2—Issue 3.

Gerbrands, J., "On the Relationships Between SVD, KLT and PCA", Pattern Recognition, 1981, pp. 375-381, vol. 14, Nos. 1-6.

Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.

Hou, .Xinwen et al., "Direct Appearance. Models", IEEE, 2001, pp. I-828-I-833.

Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.

Huang et al., "Image Indexing Using Color Correlograms", Proceedings of the 1997 Conference on Computer Vision and Pattern Recognition (CVPR '97), 1997, pp. 762.

Huang, J. et al., "Detection of human faces using decision trees, http://doI.ieeecomputersociety.org/10.1109/Recognition", 2nd International Conference on Automatic Face and Gesture Recognition (FG '96), IEEE Xplore, 2001, p. 248.

Huber, Reinhold et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.

Jones, M et al., "Fast multi-view face detection, http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/procceding/iccv/1995/7042/00/70420088abs.htm", Fifth International Conference on Computer Vision, 1995.

Kita, Nobuyuki et al., "Archiving Technology for Plant Inspection Images Captured by Mobile Active Cameras 4D Visible Memory, Abstract printed from http://csdl.computer.org/comp/proceedings/3dpvt/2002/1521/00/15210208abs.htm", 1st International Symposium on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proceedings/3pvt/2002/1521/00/15210091abs.htm", 1st International Symposium on 3D Data Processing Visualization and Transmission (3DPVT '02), 2002.

Krishnan, Arun, "Panoramic Image Acquisition, Abstract printed from http://csdlcomputer.org/comp/proceedings/cvpr/1996/7258/00/72580379abs.hum", Conference on Computer Vision and Pattern Recognition (CVPR '96), 1996.

Lai, J.H. et al., "Face recognition using holistic Fourier in variant features, http://digitalimaging.inf.brad.ac.uk/publication/pr34-1.pdf.", Pattern Recognition, 2001. pp. 95-109, vol. 34.

Lei et al., "A CBIR Method Based on Color-Spatial Feature". IEEE Region 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003. University of Birmingham.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005. pp. 245-250.

Nordstrom, M.M. et al., "The IMM face database an annotated dataset of 240 face images, http://www2.imm.dtu.dk/pubdb/p.php?3160", Informatics and Mathematical Modelling, 2004.

Ohta. Y-I et al., "Color Information for Region Segmentation. XP008026458", Computer Graphics and Image Processing, 1980, pp. 222-241. vol. 13—Issue 3, Academic Press.

Park, Daechul et al., "Lenticular Stereoscopic Imaging and Displaying Techniques with no Special Glasses, Abstract printed from http://csdl.computer.org/comp/proceedings/icip/1995/7310/03/73103137abs.htm", International Conference on Image Processing, 1995, vol. 3.

PCT International Search Report and Written Opinion of the International Searching Authority, or the Declaration, for PCT Application No, PCT/US2006/021393, filed Jun. 2, 2006, paper dated Mar. 29, 2007, 12 pgs.

PCT International Search Report and Written Opinion of the International Searching Authority, or the Declaration, for PCT Application No, PCT/US2006/060392, filed Oct. 31, 2006, paper dated Sep. 19, 2008, 9 pgs.

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329. dated Sep. 15, 2008, 12 pages.

PCT Notification of Transmittal of the International Search Report and the Written Opinion of the International Searching Authority, or the Declaration, for PCT Application No. PCT/IB2007/003724, dated Aug. 28, 2008, 9 pages.

Romdhani, S. et al., "Face Identification by Fitting a 3D Morphable Model using linear Shape and Texture Error Functions, XP003018283", European Conf on Computer Vision, 2002, pp. 1-15.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence, 1998, pp. 23-38, p. 92, vol. 20—Issue 1.

Ryu, Hanjin et al., "Coarse-to-Fine Classification for Image-Based Face Detection", Image and video retrieval lecture notes in Computer science, 2006, pp. 291-299. vol. 4071, Springer-Verlag.

Shand. M., "Flexible Image Acquisition Using Reconfigurable Hardware, Abstract printed from http://csdl.computer.org/comp/procceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl/computer.org/comp/proccedings/imac/1995/7560/00/75600071abs.htm", 4th International Conference on Image Management and Communication ( IMAC '95), 1995.

Sim, T. et al., "The CMU Pose, Illumination, and Expression (PIE) Database of Human Faces Robotics Institute, Tech. Report. CMU-RI-TR-01-02", 2001 18 pgs. Carnegie Mellon University.

Sim, T. et al., "The CMU Pose, Illumination, and Expression (PIE) database, Automatic Face and Gesture Recognition", Fifth IEEE Intl. Conf, IEEE Piscataway, NJ, USA, 2002, 6 pages.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.hml", International Conference on Pattern Recognition (ICPR '00), 2000, vol. 1.

Smeraldi, F. et al., "Facial feature detection by saccadic exploration of the Gabor decomposition. XP010586874", Image Processing, ICIP 98. Proceedings International Conference on Chicago, IL, USA, IEEE Comput. Soc, 1998, pp. 163-167, vol. 3.

Soriano, M. ct al., "Making Saturated Facial Images Useful Again, XP002325961, ISSN: 0277-786X", Proceedings of The Spie, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue 1.

Stricker et al., "Similarity of color images", SPIE Proc, 1995, pp. 1-12, vol. 2420.

Sublett, J.W. et al., "Design and Implementation of a Digital Teleultrasound System for Real-Time Remote Diagnosis, Abstract printed from http://csdl.computer.org/comp/proccedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.org/comp/proceedings/icdar/1997/7898/00/78980170abs.htm", 4th Intl Conf Document Analysis and Recognition, 1997, vol. I and II.

Tjahyadi et al., "Application of the DCT Energy Histogram for Face Recognition", Proceedings of the 2nd Intl Conference on Information Technology for Application, 2004, pp. 305-310.

Tkalcic, M. et al., "Colour spaces perceptual, historical and applicational background, ISBN: 0-7803-7763-X", IEEE, Eurocon, 2003, pp. 304- 308, vol. 1.

Turk, Matthew et al., "Eigenfaces for Recognition", Journal of Cognitive Neuroscience, 1991, 17 pgs, vol. 3—Issue 1.

Twins Crack Face Recognition Puzzle, Internet article http://www.cnn.com/2003/TECH/ptech/03/10/israel.twins.reut/ index.html, printed Mar. 10, 2003, 3 pages.

U.S. Appl. No. 11/554,539, filed Oct. 30, 2006, entitled Digital Image Processing Using Face Detection and Skin Tone Information.

Viola, P. et al.. "Rapid Object Detection using a Boosted Cascade of Simple Features", Proceedings of the 2001 IEEE Computer Society Conference on Computer Vision and Pattern Recognition, 2001, pp. 1-511-1-518, vol. 1.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern, abstract printed from http://csdl.computer.org/comp/trans/tp/1990/02/i01488abs.htm", IEEE Transactions on Pattern Analysis and Machine Intelligence, 1990, 1 page.

Wan, S.J. et al.. "Variance-based color image quantization for frame buffer display". S. K. M. Wong Color Research and Application, 1990, pp. 52-58, vol. 15—Issue 1.

Xin He ct al., "Real-Time Human Face Detection in Color Image", International Conference on Machine Learning and Cybernetics, 2003, pp. 2915-2920, vol. 5.

Yang, Ming-Hsuan et al., "Detecting Faces in Images: A Survey, ISSN:0162-8828, http://portal.acm.org/citation.cfm?id=505621andcoll=GUIDEanddl=GUIDEandCFID=680-9268andCFTOKEN=82843223.". IEEE Transactions on Pattern Analysis and Machine Intelligence archive, 2002, pp. 34-58, vol. 24—Issue I, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, ISSN: 0360-0300,http://portal.acm.org./citation.cfm?id=954342andcoll=GUIDEandd1=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

Co-pending U.S. Appl. No. 12/790,594.

Co-pending U.S. Appl. No. 12/825,280.

Co-pending U.S. Appl. No. 12/843,805.

Final Office Action mailed Mar 23, 2010, for U.S. Appl. No. 11/688,236 filed Mar. 19, 2007.

Final Office Action mailed Nov. 18, 2009, for U.S. Appl. No. 11/554,539 filed Oct. 30, 2006.

Machin, et al., "Real Time Facial Motion Analysis for Virtual Teleconferencing," IEEE, 1996, pp. 340-344.

Ming, et al., "Human Face Orientation Estimation Using Symmetry and Feature Points Analysis," IEEE, 2000, pp. 1419-1422.

Non-Final Office Action mailed Apr. 2, 2010, for U.S. Appl. No. 10/608,784 filed Jun 26, 2003.

Non-Final Office Action mailed Apr. 30, 2010, for U.S. Appl. No. 11/765,899 filed Jun. 20, 2007.

Non-Final Office Action mailed Aug. 2, 2010, for U.S. Appl. No. 11/688,236 filed Mar 19, 2007.

Non-Final Office Action mailed Aug 19, 2009, for U.S. Appl. No. 11/773,815, filed Jul. 5, 2007.

Non-Final Office Action mailed Aug 20, 2009, for U.S. Appl. No. 11/773,855, filed Jul. 5, 2007.

Non-Final Office Action mailed Jan. 20, 2010, for U.S. Appl. No. 12/262,024 filed Oct. 30, 2008.

Non-Final Office Action mailed Jun. 14, 2010, for U.S. Appl. No. 11/624,683 filed Jan 18, 2007.

Non-Final Office Action mailed Jun. 16, 2010, for U.S. Appl. No. 12/482,305 filed Jun 10, 2009.

Non-Final Office Action mailed Jun. 23, 2010, for U.S. Appl. No. 11/941,956, filed Nov. 18, 2007.

Non-Final Office Action mailed May 12, 2010, for U.S. Appl. No. 11/554,539 filed Oct. 30, 2007.

Non-Final Office Action mailed Sep. 8, 2009, for U.S. Appl. No. 11/688,236 filed Mar. 19, 2007.

Notice of Allowance mailed Sep. 28, 2009, for U.S. Appl. No. 12/262,037 filed Oct. 30, 2008.

PCT Notification of Transmittal of the International Search Report and the Written Opinion of the International Searching Authority, or the Declaration, for PCT Application No. PCT/EP2009/005461, dated Apr. 20, 2010, 12 pages.

Yao, Christina: "Image Cosmetics: An automatic Skin Exfoliation Framework on Static Images" UCSB Four Eyes Lab Imaging, Interaction, and Innovative Interfaces Publications Thesis, Master of Science in Media Arts and Technology Dec. 2005, pp. 1-83, Retrieved from the Internet : URL: http://ilab.cs.ucsb.edu/publications/YaoMS.pdf.

* cited by examiner

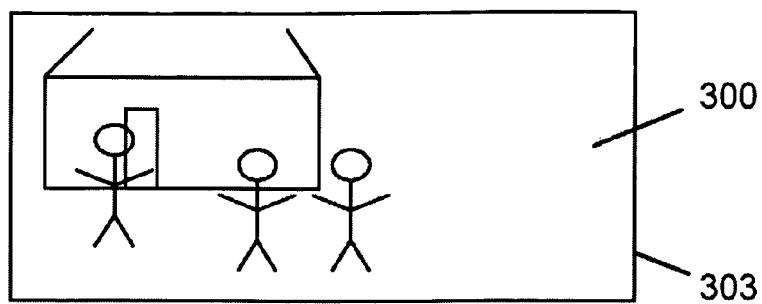
Fig. 3.1
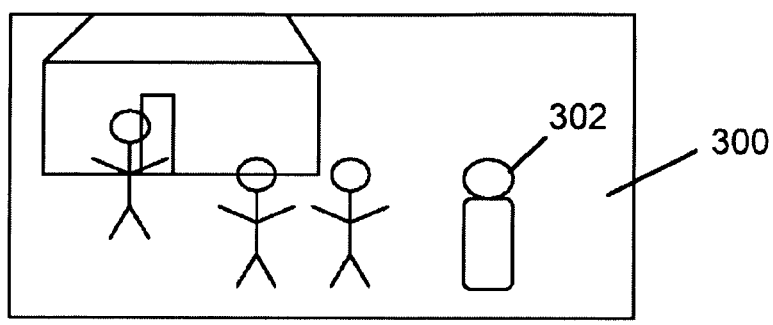
Fig. 3.2
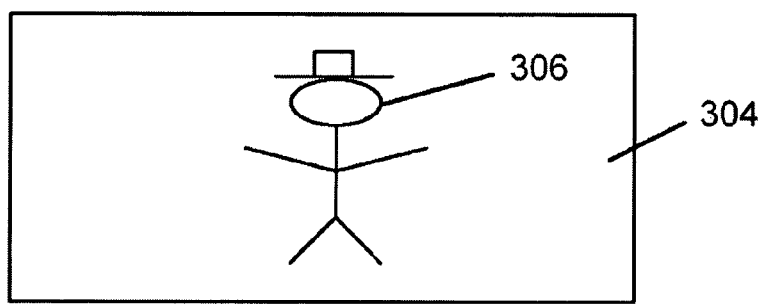
Fig. 3.3
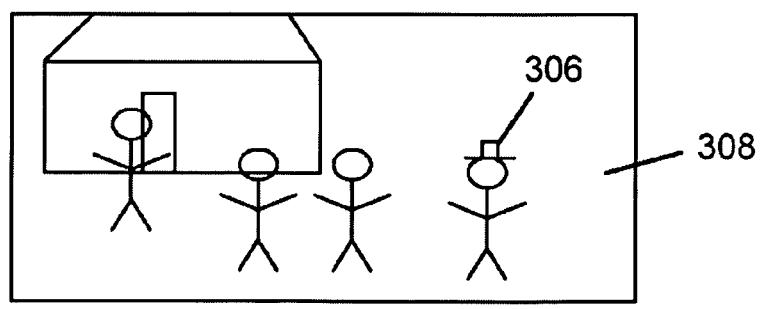
Fig. 3.4

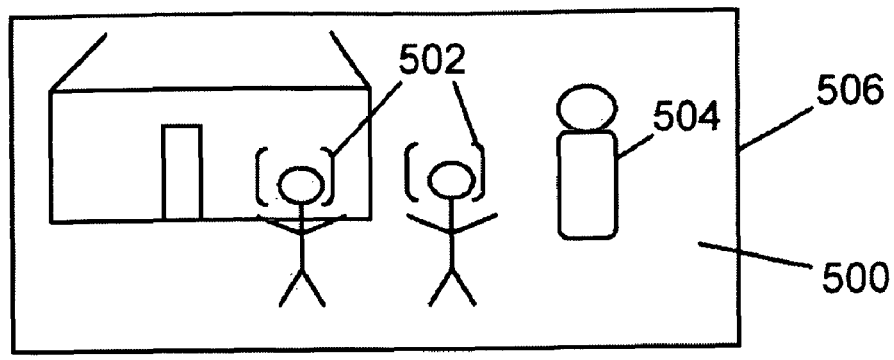
Fig. 5.1
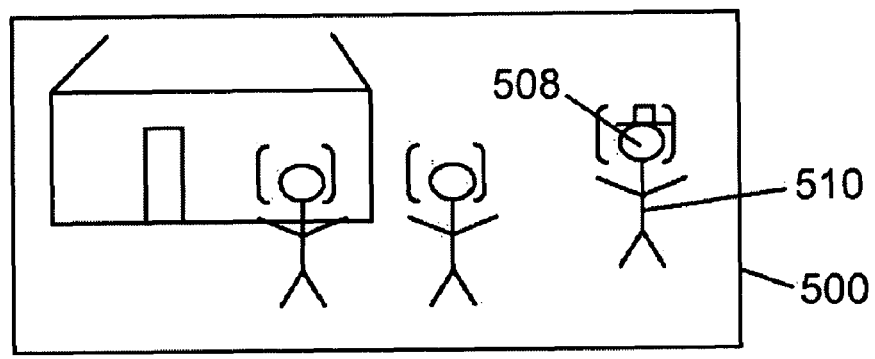
Fig. 5.2
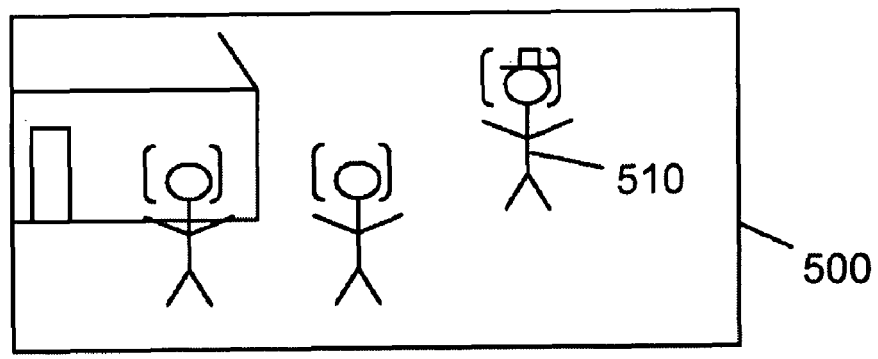
Fig. 5.3

METHOD OF MAKING A DIGITAL CAMERA IMAGE OF A SCENE INCLUDING THE CAMERA USER

The present invention relates to a method of making a digital camera image of a scene including the camera user.

BACKGROUND OF THE INVENTION

A disadvantage with conventional digital cameras is that the camera user, i.e. the photographer, is located on the opposite side of the camera to the scene being photographed, so that he is automatically excluded from the scene. Self-timers which set a delay between pressing the shutter button and releasing the shutter allow the user to move round to the front of the camera in time to appear in the scene. However, the user has to position himself in the scene by guesswork and has no accurate control as to his position or size in the scene.

US Patent Application Publication No. US 2006/0125928 discloses a digital camera having forward and rear facing lenses, so that an image of the user can be taken at the same time as the image of the scene. The image of the user is then "associated" with the image of the scene. However, such association does not provide a natural integration of the user into the scene.

SUMMARY OF THE INVENTION

In a first embodiment, a method of making an image in a digital camera is provided, comprising capturing a digital image of a scene into which the camera user is to be inserted, and superimposing a symbol (subject locator) onto the scene image representing at least a part of a human subject. The subject locator is scaled to a desired size and moved to a desired position relative to the scene image. Next a digital image of the user is captured, and at least the part of the user image represented by the subject locator is extracted. The part of the user image represented by the subject locator is scaled (before or after extraction) to substantially the same size as the subject locator and inserted into the first image at the position of the subject locator.

In a second embodiment, a further method of making an image in a digital camera is provided, comprising displaying a preview image of a scene into which the camera user is to be inserted, and superimposing the subject locator on the preview image. The subject locator is scaled to a desired size and moved to a desired position relative to the edges of the preview image. The camera user is detected entering the scene displayed by the preview image, and the preview image is scaled and panned to bring the part of the preview image represented by the subject locator to substantially the same size and position as the subject locator. Finally, a digital image of the scene is captured.

BRIEF DESCRIPTION OF THE DRAWINGS

Embodiments of the invention will now be described by way of example with reference to the accompanying drawings, in which:

FIGS. 3.1 to 3.4 are schematic diagrams illustrating the operation of the first embodiment.

FIGS. 5.1 to 5.3 are schematic diagrams illustrating the operation of the second embodiment.

DESCRIPTION OF THE PREFERRED EMBODIMENTS

In the present specification, the term "image" refers to image data and, except where the context requires, does not necessarily imply that an actual viewable image is present at any particular stage of the processing.

Figure 1:
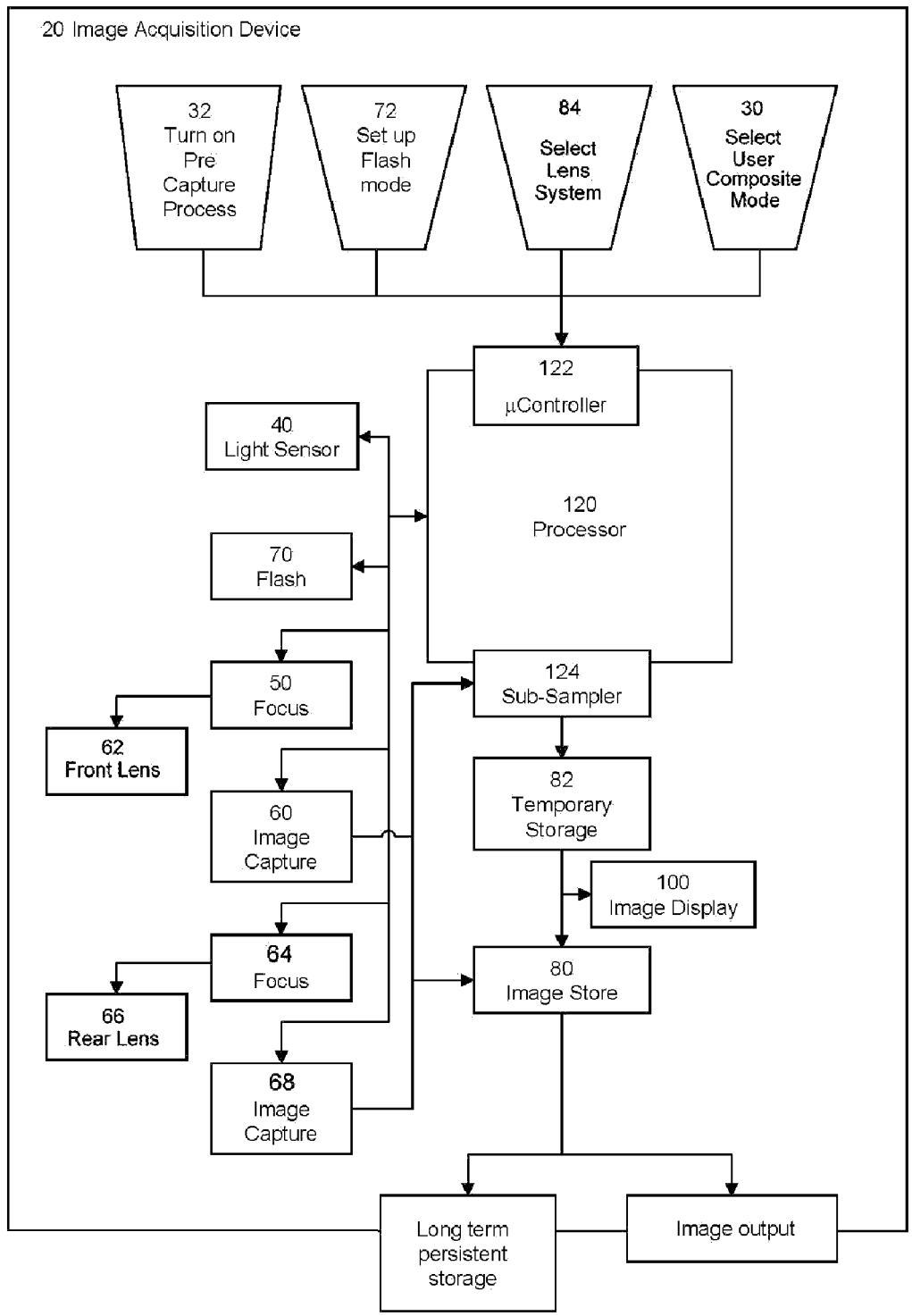
FIG. 1 is a block diagram of a digital camera operating in accordance with an embodiment of the present invention.

FIG. 1 is a block diagram of a digital image acquisition device 20 which may be a portable digital camera per se or a digital camera incorporated into a cell phone (in the latter case only the camera components of the phone are shown). The device includes a processor 120. It can be appreciated that many of the processes implemented in the digital camera may be implemented in or controlled by software operating in a microprocessor, central processing unit, controller, digital signal processor and/or an application specific integrated circuit, collectively depicted as processor 120. Generically, all user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is monitored using light sensor 40 in order to automatically determine if a flash is to be used. A distance to the subject is determined using a focus component 50, which controls a zoomable main lens system 62 on the front of the camera to focus an image of an external scene onto an image capture component 60 within the camera. If a flash is to be used, processor 120 causes the flash 70 to generate a photographic flash in substantial coincidence with the recording of the image by image capture component 60 upon full depression of the shutter button. The image capture component 60 digitally records the image in colour. The image capture component preferably includes a CCD (charge coupled device) or CMOS to facilitate digital recording. The flash may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory. The camera is equipped with a display screen 100, such as an LCD, for preview and post-view of images.

In the case of preview images which are generated in the pre-capture mode 32 with the shutter button half-pressed, the display 100 can assist the user in composing the image, as well as being used to determine focusing and exposure. Temporary storage 82 is used to store one or more of the preview images and can be part of the image store 80 or a separate component. The preview image is preferably generated by the image capture component 60. For speed and memory efficiency reasons, preview images preferably have a lower pixel resolution than the main image taken when the shutter button is fully depressed, and are generated by sub-sampling a raw captured image using software 124 which can be part of the general processor 120 or dedicated hardware or combination thereof. Depending on the settings of this hardware subsystem, the pre-acquisition image processing may satisfy some predetermined test criteria prior to storing a preview image. Such test criteria may be chronological, such as to constantly replace the previous saved preview image with a new captured preview image every 0.5 seconds during the pre-capture mode 32, until the high resolution main image is captured by full depression of the shutter button. More sophisticated criteria may involve analysis of the preview image content, for example, testing the image for changes, before deciding whether the new preview image should replace a previously saved image. Other criteria may be based on image analysis such as the sharpness, or metadata analysis such as the exposure condition, whether a flash is going to happen, and/or the distance to the subject.

If test criteria are not met, the camera continues by capturing the next preview image without saving the current one. The process continues until the final high resolution main image is acquired and saved by fully depressing the shutter button.

Where multiple preview images can be saved, a new preview image will be placed on a chronological First In First Out (FIFO) stack, until the user takes the final picture. The reason for storing multiple preview images is that the last preview image, or any single preview image, may not be the best reference image for comparison with the final high resolution image in, for example, a red-eye correction process or, in the present embodiment, mid-shot mode processing. By storing multiple images, a better reference image can be achieved, and a closer alignment between the preview and the final captured image can be achieved in an alignment stage discussed later.

The camera is also able to capture and store in the temporary storage 82 one or more low resolution post-view images. Post-view images are low resolution images essentially the same as preview images, except that they occur after the main high resolution image is captured.

In addition to the zoomable main lens system 62, the camera includes a zoomable subsidiary lens system 66 and corresponding image capture component 68. In a cell phone the subsidiary lens system 66 normally faces rearwardly towards a user holding the phone, that is, in the opposite direction to the forwardly facing front lens system 62. This allows the user to enter into a video phone call with a remote party while holding the phone in a natural manner. The components allowing video calling are not relevant to the present invention and are not shown. The subsidiary lens system 66 may be focusable, using a focus component 64, or have a fixed focus in which case the focus component 64 would be omitted. A user input 84 allows the user to select either one of the lens systems for use, the same processing circuitry, as shown in FIG. 1, being used for both except that in this embodiment a rearward-facing flash, corresponding to the forward-facing flash 70, is omitted.

Figure 2:
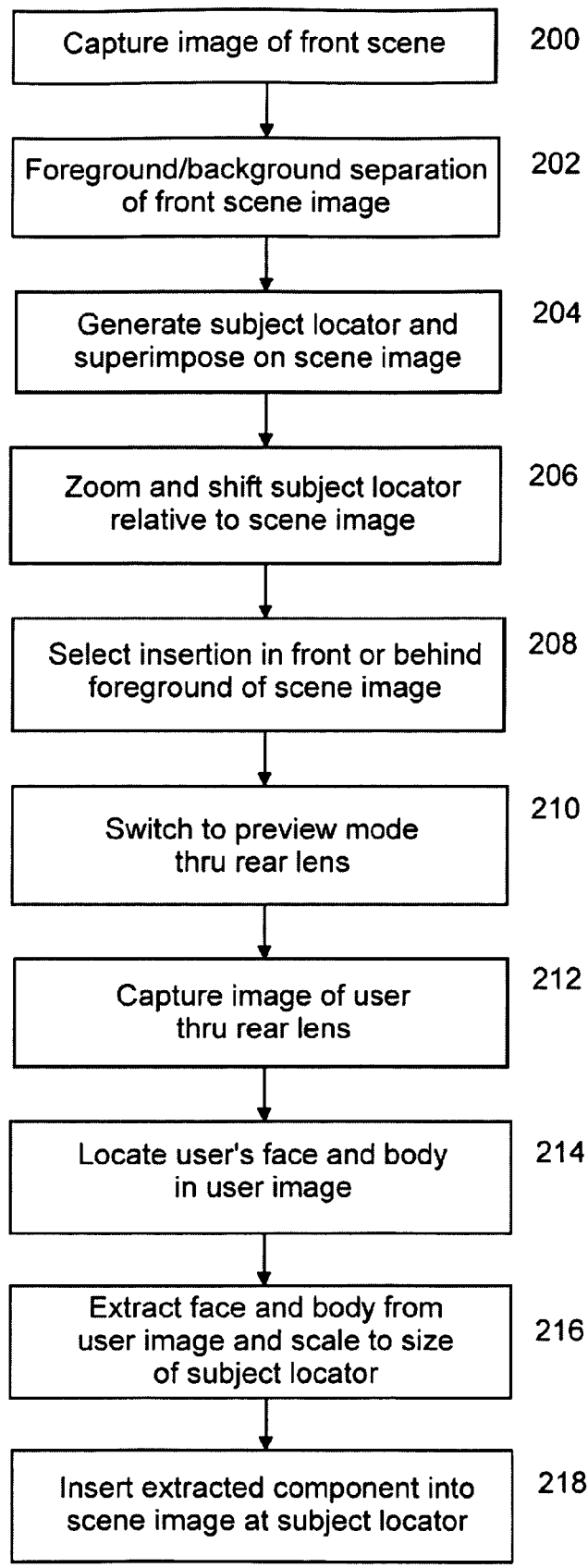
FIG. 2 is a flow diagram of the steps performed by software in the camera of FIG. 1 in a first embodiment of the invention.

The camera includes a "User Composite Mode" which can be selected by a user input 30 at any time that a user wishes to be inserted into a scene imaged by the front lens system 62 and currently previewed on the camera display screen 100. FIG. 2 is a flow diagram of the steps performed by software in the camera of FIG. 1 when User Composite Mode is selected in a first embodiment of the invention. Where a user input is required for any particular step, the existing camera controls may be programmed for this purpose.

Step 200: In response to full depression of the shutter button, a first still image 300 (FIG. 3.1) of the scene imaged by the front lens 62 on the component 60 is captured. The first image 300 is displayed on the screen 100.

Step 202: Foreground/background separation on the image 300 is optionally performed using techniques described in, for example, International Patent Application No.'s. PCT/EP2006/008229 (FN119) and PCT/EP2006/005109 (FN122). The separation data is stored for use in step 208.

Step 204: In response to user input, a subject locator 302 (FIG. 3.2) is generated and superimposed on the displayed image 300. The subject locator 302 is a symbol representing all or part of a human subject. In the present case the subject locator is a simplified outline of the head and body of a human subject. The subject locator may be available in several different profiles corresponding to, e.g., head and shoulders, mid-shot or full length, in which case the user selects the desired one. The subject locator 302 shown in FIG. 3.2 is assumed to be a full length profile.

Step 206: In response to user input, the subject locator 302 is shifted relative to the image frame defined by the edges 303 of the display screen 100 to place the subject locator at a desired position relative to the still image 300. The subject locator may also be zoomed (i.e. scaled up or down) to a desired size relative to the image frame. A conventional four-way directional menu control may be used to shift the subject locator, and a conventional manual zoom control may be used to zoom the subject locator, both controls being programmed in User Composite Mode for those purposes.

Step 208: If step 202 was performed, the user also selects, in a case where the subject locator 302 partly overlaps the foreground of the image 300, whether the user is to be inserted in front of or behind the foreground of the image 300.

Step 210: Once selections in step 208 are confirmed, the camera switches to preview mode of the image seen through the rear lens 66, i.e. an image of the user.

Step 212: In response to full depression of the shutter button, a second still image 304 (FIG. 3.3) of the user imaged by the rear lens 66 on the component 68 is captured. The second image 304 is displayed on the screen 100 for confirmation by the user. If not confirmed, one or more further images may be captured until the user is satisfied with the captured image 304.

Step 214: Upon confirmation, the software performs face detection and/or foreground/background separation on the second image 304 to locate the user's face and body 306, or as much as is captured in the image 304. Face detection may use techniques described in, for example, International Patent Application No. PCT/EP2007/005330 (FN143), while foreground/background separation may use techniques as previously referred to.

Step 216: The software extracts the face and—depending on the profile of the selected subject locator—all or part of the user's body from the second image 304. For example, if the subject locator were a head and shoulders profile, the software would only extract the head and shoulders of the user. The software then scales the extracted image component up or down to substantially the same size as the subject locator. Alternatively, the scaling could be done by digitally zooming the entire second image 304 before extraction of the face and (part of the) body.

Step 218: Finally, the image component extracted in step 216 is inserted into the first image 300 at the position of the subject locator 302 to provide a composite image 308, FIG. 3.4, in which the inserted image component replaces the underlying original image data and the subject locator is removed. Known blending techniques may be used to smooth the transition between the inserted image component 306 and the original scene 300. If steps 202 and 208 were performed in a case where the subject locator 302 partly overlaps the foreground of the image 300, only that part of the extracted image component overlapping the background of the image 300 is inserted into the image 300. In a variation of this step the software could extract all of the face and body in step 216 and only insert the part corresponding to the selected subject locator profile in step 218 (e.g. head and shoulders).

Various modifications of the above embodiment are possible.

The first and second images 300, 304 need not be captured in the order stated; for example, steps 210 to 214 could be done before steps 200 to 208. If desired, bearing mind that in this embodiment the camera has both front and rear lens systems, the first and second images could be captured at substantially the same time. In another modification, one or both images 300, 304 could be pre-existing images, i.e. captured and stored before the user enters User Composite Mode. In that case, steps 200 and 212 would consist of selecting the relevant images from the stored images.

In a case where the camera is not a dual-lens camera, i.e. it has only a front-facing lens 62, the second image 304 could be captured through the front lens by allowing the user time to move round to the front of the camera or to turn the camera around to face the user. The second image could then either be captured using a timer; or if the camera has a secondary front facing display, through the user manually capturing the second image when they are satisfied with the image shown in the secondary display; or alternatively by automatically capturing a suitable image of the user fitting the profile as described for the second embodiment. Further alternatively, the second image 304 could be taken by a third party.

Furthermore, where the camera is provided with a speaker, the software could be arranged to produce audio directions via the speaker in order to guide the user to a desired location within the scene in order to improve or replace the scaling referred to in step 216. For example, the user could be instructed to move left, right, forward or backwards within the scene.

In another variation the scaling referred to in step 216 could be done before extraction by performing face detection and/or foreground/background separation on a preview of the second image 304 to locate the user's face and body 306, and then optically zoom the preview so that when the second image is 304 captured the face and body are already at the correct size for placement at the subject locator 302 in the image 300.

It is also to be noted that by placing the subject locator 302 in front of a person in the original scene 300, the user can replace that person in the scene. It is also possible, by having a subject locator profile corresponding just to a face, to replace a person's face while retaining their original clothing, etc.

Figure 4:
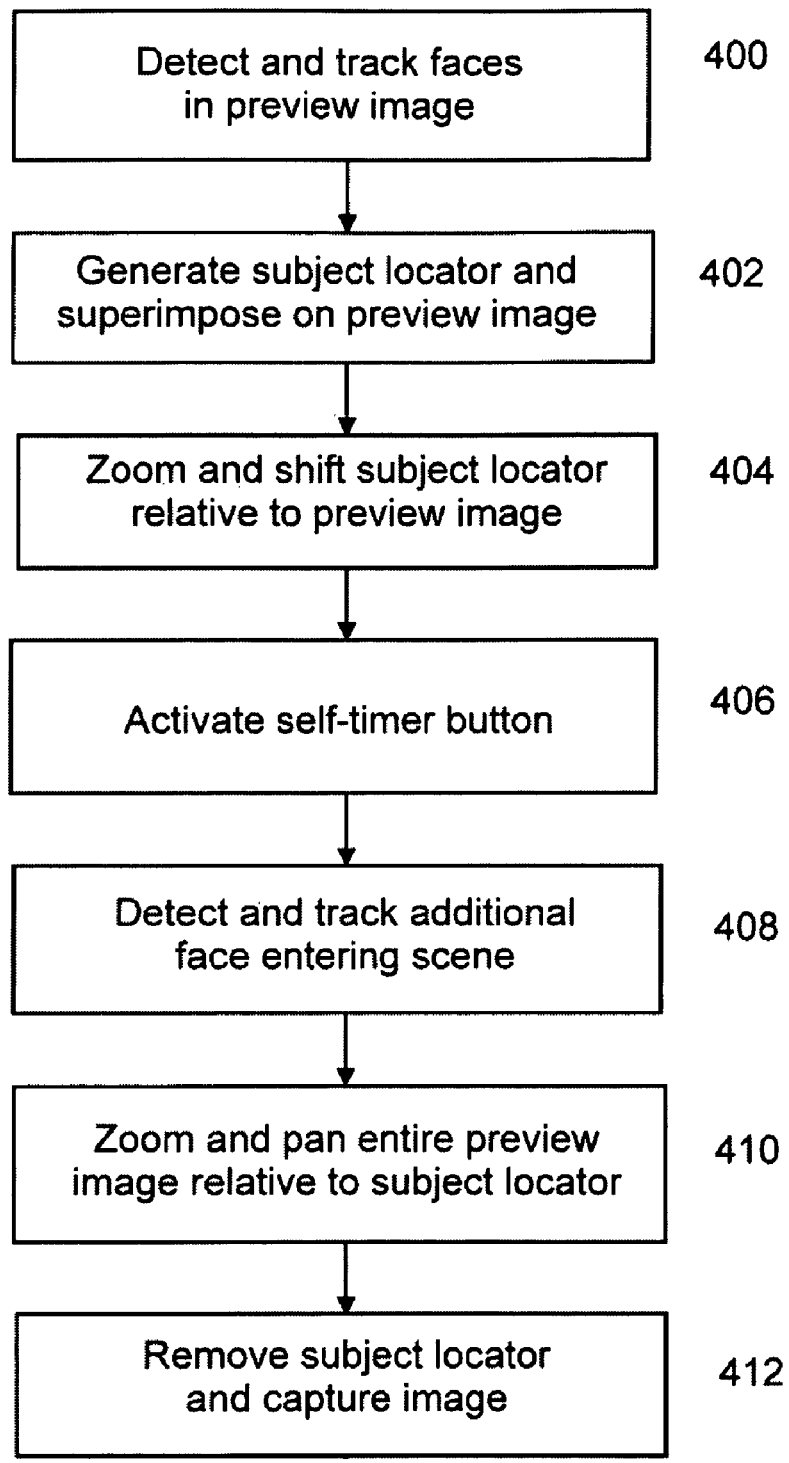
FIG. 4 is a flow diagram of the steps performed by software in the camera of FIG. 1 in a second embodiment of the invention.

FIG. 4 is a flow diagram of the steps performed by software in the camera of FIG. 1 when User Composite Mode is selected in a second embodiment of the invention. At the commencement of the process it is assumed that the camera is in preview mode and the display 100 is showing a preview image derived through the front lens system 62, i.e. a preview of a scene into which the user wishes to be inserted. Again, where a user input is required for any particular step, the existing camera controls may be programmed for this purpose.

Step 400: A face detection algorithm locates and tracks faces (if any) in the displayed preview image 500. In FIG. 5.1 face tracking is indicated by the brackets 502.

Step 402: In response to user input, a subject locator 504 is generated and superimposed on the displayed preview image 500. As before, the subject locator may be available in several different profiles, in which case the user selects the desired one.

Step 404: In response to user input, the subject locator 504 is shifted relative to the image frame defined by the edges 506 of the display screen 100 to place the subject locator at a desired position relative to the preview image 500. The subject locator may also be zoomed to a desired size relative to the image frame.

Step 406: User activates a self-timer button to allow the user to move round to front of camera and enter the scene.

Step 408: The software detects and tracks an (additional) face 508 entering the scene.

Step 410: When the software detects that the additional face 508 has substantially stopped moving, or at the expiration of a time period set by the self-timer button, the entire preview image is zoomed (optically and/or digitally) and panned (digitally) to bring the image 510 of the user (or relevant part as determined by the subject locator profile) to a position where it is superimposed on the subject locator 504 with a size substantially the same as that of the subject locator. Note that the position of the subject locator 504 is fixed relative to the edges 506 of the frame so that panning and zooming the preview image effectively moves the entire image relative to the subject locator.

Step 412: When the panning and zooming is complete, the subject locator 504 is removed and the scene imaged by the front lens 62 on the component 60 is captured.

In a variation of the above embodiment, where the camera is provided with a speaker, at step 410, the software is arranged to produce audio directions via the speaker in order to guide the user to a desired location within the scene. For example, referring to FIGS. 5.2 and 5.3, were the user to enter the scene from the left hand side, he may position himself to the left of the subjects already present in the preview image. In such a case and as a result of the zooming and panning of step 410, it is possible that the captured image may no longer display those subjects, and the preview image would not be substantially equal to the image captured. Thus, by guiding the user, for example, by instructing him to move to the right, an image substantially equal to that of the preview image can be captured.

The invention is not limited to the embodiment(s) described herein but can be amended or modified without departing from the scope of the present invention.

The invention claimed is:

1. A method of making an image in a digital camera, the method comprising the following steps, not necessarily in the order stated:
   (a) capturing a first digital image of a scene into which a camera user is to be inserted ("first image"),
   (b) before capturing a second digital image including the camera user, superimposing on the first image a subject locator that comprises a symbol ("subject locator") representing at least a part of a human subject,
   (c) also before capturing the second digital image including the camera user, scaling the subject locator to a desired size and moving it to a desired position relative to the first image,
   (d) capturing the second digital image including of the camera user ("second image"),
   (e) extracting at least the part of the second image represented by the subject locator,
   (f) scaling the part of the second image represented by the subject locator to substantially the same size as the subject locator, and
   (g) inserting the scaled extracted part of the second image into the first image at the position of the subject locator.

2. The method claimed in claim 1, in which the scaling step (f) is performed on the extracted part of the second image.

3. The method claimed in claim 1, in which the scaling step (f) is performed on the second image prior to extraction of the part represented by the subject locator.

4. The method claimed in claim 1, wherein the camera has two lens systems facing forwardly and rearwardly respectively of the camera, the first image being captured by the first lens system and the second image being captured by the second lens system.

5. The method claimed in claim 1, wherein the first and second images are captured through the same lens system.

6. The method claimed in claim 5, wherein the second image is captured using a self-timer.

7. The method claimed in claim 1, in which the extracting step (e) is performed by at least one of face detection and foreground/background separation.

8. A digital camera including an optical system for acquiring digital images and one or more processor-readable media having embodied therein processor-readable code for programming a one or more processors to perform the method claimed in claim 1.

9. The digital camera claimed in claim 8, wherein the camera forms part of a cell phone.

10. The method claimed in claim 1, further comprising separating foreground and background for the first image, and wherein the superimposing of the subject locator partly overlaps the foreground of the first image, and the method further comprises selecting whether the user is to be inserted in front of or behind the foreground of the first image.

11. The method claimed in claim 1, further comprising selecting a profile of the subject locator and determining the scaled extracted part of the second image based on the profile of the subject locator.

12. The method claimed in claim 11, wherein the profile of the subject locator comprises head and shoulders, mid-shot or full length.

13. The digital camera claimed in claim 8, in which the scaling is performed on the extracted part of the second image.

14. The digital camera claimed in claim 8, in which the scaling is performed on the second image prior to extraction of the part represented by the subject locator.

15. The digital camera claimed in claim 8, wherein the camera has two lens systems facing forwardly and rearwardly respectively of the camera, the first image being captured by the first lens system and the second image being captured by the second lens system.

16. The digital camera claimed in claim 8, wherein the first and second images are captured through the same lens system.

17. The digital camera claimed in claim 16, wherein the second image is captured using a self-timer.

18. The digital camera claimed in claim 8, in which the extracting is performed by at least one of face detection and foreground/background separation.

19. The digital camera claimed in claim 8, wherein the method further comprises separating foreground and background for the first image, and wherein the superimposing of the subject locator partly overlaps the foreground of the first image, and the method further comprises selecting whether the user is to be inserted in front of or behind the foreground of the first image.

20. The digital camera claimed in claim 8, wherein the method further comprises selecting a profile of the subject locator and determining the scaled extracted part of the second image based on the profile of the subject locator.

21. The digital camera claimed in claim 20, wherein the profile of the subject locator comprises head and shoulders, mid-shot or full length.

22. One or more non-transitory processor-readable media having embodied therein processor-readable code for programming a one or more processors to perform the method claimed in claim 1.

23. The one or more non-transitory processor readable media claimed in claim 22, wherein the camera forms part of a cell phone.

24. The one or more non-transitory processor readable media claimed in claim 22, in which the scaling is performed on the extracted part of the second image.

25. The one or more non-transitory processor readable media claimed in claim 22, in which the scaling is performed on the second image prior to extraction of the part represented by the subject locator.

26. The one or more non-transitory processor readable media claimed in claim 22, wherein the camera has two lens systems facing forwardly and rearwardly respectively of the camera, the first image being captured by the first lens system and the second image being captured by the second lens system.

27. The one or more non-transitory processor readable media claimed in claim 22, wherein the first and second images are captured through the same lens system.

28. The one or more non-transitory processor readable media claimed in claim 27, wherein the second image is captured using a self-timer.

29. The one or more non-transitory processor readable media claimed in claim 22, in which the extracting is performed by at least one of face detection and foreground/background separation.

30. The one or more non-transitory processor readable media claimed in claim 22, wherein the method further comprises separating foreground and background for the first image, and wherein the superimposing of the subject locator partly overlaps the foreground of the first image, and the method further comprises selecting whether the user is to be inserted in front of or behind the foreground of the first image.

31. The one or more non-transitory processor readable media claimed in claim 22, wherein the method further comprises selecting a profile of the subject locator and determining the scaled extracted part of the second image based on the profile of the subject locator.

32. The one or more non-transitory processor readable media claimed in claim 31, wherein the profile of the subject locator comprises head and shoulders, mid-shot or full length.

* * * * *